UNITED STATES PATENT OFFICE.

OSCAR GÜNTHER AND LEOPOLD HESSE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

935,018.   Specification of Letters Patent.   Patented Sept. 28, 1909.

No Drawing.   Application filed May 4, 1909.   Serial No. 493,771.

*To all whom it may concern:*

Be it known that we, OSCAR GÜNTHER and LEOPOLD HESSE, doctors of philosophy, chemists, citizens of the German Empire, residing at Elberfeld, Germany, have invented new and useful Improvements in new Azo Coloring-Matter, of which the following is a specification.

Our invention relates to the manufacture and production of new azo dyestuffs capable of dyeing unmordanted cotton from yellow to orange shades fast to light.

The process for their production consists in converting sulfonic acids of aminoazo compounds obtainable from diazotized naphthylamin sulfonic acids into the symmetrical compounds by treatment with phosgen. The new dyes are after being dried and pulverized in the shape of their alkaline salts dark powders soluble in water and soluble in concentrated sulfuric acid with a bluish color. Upon reduction with stannous chlorid and hydrochloric acid a naphthylamin sulfonic acid and a urea of a diamin is obtained which is split up into carbonic acid and a diamin.

To illustrate our process we can proceed as follows, the parts being by weight:—1018 parts of the sodium salt of the aminoazo dyestuff: 1-naphthylamin-3.6-disulfonic acid+para-cresidin are dissolved in water. Phosgen is introduced into this solution which has to be stirred and kept alkaline until the production of the urea is complete. The new dye is after being dried and pulverized in the shape of its sodium salt a dark red powder soluble in water with a red color and soluble in concentrated sulfuric acid with a blue color; yielding upon reduction with stannous chlorid and hydrochloric acid 1-naphthylamin-3.6-disulfonic acid and 4.4'-diamino-3.3'-dimethyl-6.6'-diethoxydiphenyl urea which is further decomposed into 3-methyl-6-ethoxy-para-phenylenediamin and carbonic acid. It dyes cotton a clear orange shade.

The process is carried out in an analogous manner on using other of the above mentioned aminoazo compounds. The dye obtained from: 1-naphthylamin-3.6-disulfonic acid+ortho-anisidin dyes cotton reddish-yellow, that obtained from: 2-naphthylamin-4.8-disulfonic acid+ortho-anisidin dyes cotton gold-yellow and that obtained from: 2-naphthylamin-4.8-disulfonic acid+1-naphthylamin dyes cotton orange.

We claim:

1. The herein described new dyestuffs being ureas of sulfonic acids of aminoazo compounds obtainable from naphthylamin sulfonic acids and amins which dyes are after being dried and pulverized in the shape of their alkaline salts dark powders soluble in water and soluble in concentrated sulfuric acid with a bluish color; yielding upon reduction with stannous chlorid and hydrochloric acid a naphthylamin sulfonic acid and a urea of a diamin which is further decomposed into carbonic acid and a diamin; dyeing cotton from yellow to orange shades; substantially as described.

2. The herein described new dyestuff being the urea of the aminoazo compound obtainable from 1-naphthylamin-3.6-disulfonic acid and para-cresidin, which is after being dried and pulverized in the shape of its sodium salt a dark red powder soluble in water with a red color and soluble in concentrated sulfuric acid with a blue color; yielding upon reduction with stannous chlorid and hydrochloric acid 1-naphthylamin-3.6-disulfonic acid and 4.4'-diamino-3.3'-dimethyl-6.6'-diethoxydiphenyl urea which is further decomposed into 3-methyl-6-ethoxy-para-phenylenediamin and carbonic acid; dyeing cotton orange shades fast to light; substantially as described.

In testimony whereof we have hereunto set our hands in the presence of two subscribing witnesses.

OSCAR GÜNTHER. [L. S.]
LEOPOLD HESSE. [L. S.]

Witnesses:
OTTO KÖNIG,
C. J. WRIGHT.